United States Patent
Boot

Patent Number: 5,723,199
Date of Patent: Mar. 3, 1998

[54] METHOD OF EXTRUDING TWO OR MORE MATERIALS

[75] Inventor: Peter Lawrence Boot, Worcestershire, England

[73] Assignee: Reddiplex Group PLC, Droitwich, England

[21] Appl. No.: 593,249

[22] Filed: Jan. 29, 1996

[30] Foreign Application Priority Data

Jan. 31, 1995 [GB] United Kingdom ............... 9501774

[51] Int. Cl.$^6$ .............................. B29C 47/06; B29C 59/04
[52] U.S. Cl. .............. 428/158; 156/244.11; 264/46.1; 264/132; 264/148; 264/152; 264/173.1; 264/173.17; 264/177.19; 264/284; 425/385
[58] Field of Search ....................... 264/145, 177.1, 264/177.19, 173.1, 172.19, 173.17, 173.18, 152, 284, 46.1, 132, 148; 156/244.11, 244.24; 425/385; 428/151, 158

[56] References Cited

U.S. PATENT DOCUMENTS

| | | | |
|---|---|---|---|
| 3,594,254 | 7/1971 | Lemelson | 156/384 |
| 3,711,360 | 1/1973 | Kent | 156/244.11 |
| 3,753,285 | 8/1973 | Gewertz | 264/152 |
| 3,758,992 | 9/1973 | Olson | 264/321 |
| 3,764,642 | 10/1973 | Boutillier | 264/48 |
| 3,900,544 | 8/1975 | Johnson et al. | 264/177.19 |
| 4,076,570 | 2/1978 | Medley et al. | 156/500 |
| 5,069,849 | 12/1991 | Wain | 264/152 |
| 5,069,851 | 12/1991 | Hicks et al. | 264/172.19 |
| 5,126,088 | 6/1992 | Andres | 264/173.17 |
| 5,186,876 | 2/1993 | Purstinger et al. | 264/173.17 |
| 5,226,998 | 7/1993 | Few | 156/244.11 |
| 5,232,751 | 8/1993 | Cameron et al. | 264/173.18 |
| 5,415,822 | 5/1995 | Cook | 264/173.17 |
| 5,508,103 | 4/1996 | Cope | 264/177.1 |
| 5,514,318 | 5/1996 | Detenon | 264/132 |

FOREIGN PATENT DOCUMENTS

| | | |
|---|---|---|
| 0 372 745 | 6/1990 | European Pat. Off. . |
| 54-155259 | 12/1979 | Japan ................ 264/293 |
| 57-031526 | 2/1982 | Japan . |
| 58-56835 | 4/1983 | Japan . |
| 5-024166 | 2/1993 | Japan . |
| 6-171038 | 6/1994 | Japan . |
| 920 159 | 3/1963 | United Kingdom . |
| 1 450 465 | 9/1976 | United Kingdom . |
| 1 540 679 | 2/1979 | United Kingdom . |
| 2 046 661 | 11/1980 | United Kingdom . |
| 2 052 360 | 1/1991 | United Kingdom . |
| 2 275 363 | 8/1994 | United Kingdom . |
| 2 276 318 | 9/1994 | United Kingdom . |
| 90/08639 | 8/1990 | WIPO . |

*Primary Examiner*—Jeffery R. Thurlow
*Attorney, Agent, or Firm*—Renner, Kenner, Greive, Bobak, Taylor & Weber

[57] ABSTRACT

A method of making ornamented elongate members, for example for picture frames, uses the steps of extruding a first material and cooling it so that it is substantially solid, extruding a second material along a surface of the first material, which is arranged to undergo a change enabling a firm bond to be formed between the materials, shaping the second material to produce surface ornamentation and cooling the first and second materials. This provides an inexpensive and quick way of producing ornamented members.

12 Claims, 2 Drawing Sheets

METHOD OF EXTRUDING TWO OR MORE MATERIALS

BACKGROUND OF THE INVENTION

The present invention relates to a method of extruding two or more materials, and especially to a method of manufacturing ornamented elongate members, in particular for use as picture members or dado rails for interior decoration.

Such members are traditionally made of wood or plaster, but these are now very expensive. In order to reduce the cost, it is known to use simple plastics extrusions, which are considerably cheaper to produce, but these cannot easily produce detailed ornamentation. Other known extrusions techniques using two or more materials are not suitable for forming ornamented members, which require a firmly bonded structure, and the ability to be decorated by mechanical treatment. For example, co-extrusion of two materials forms a firmly bonded structure, but as the materials tend to solidify at the same rate, it is not possible to shape one material to form ornamentation by applying pressure, as the other material would not be sufficiently solid to withstand the process. Sequential extrusion of materials is known, where a first material is becoming solid before a second is applied. Such sequential extrusion is generally used for seals, and either a firm bond is not formed between the materials, or pressure cannot be applied to the second material to form ornamentation, as the first material is not sufficiently solid.

Another method of producing ornamented elongate members using an extrusion process is shown in GB-A-2 276 318, where an extruded plastics material is ornamented by applying a solvent-based wood paste. The two materials form a surprisingly good bond, and the wood paste can be shaped to form ornamentation. However, this process has several disadvantages. Most notably, the finished product takes a substantial time to dry, of the order of several hours, and has a tendency to bow significantly. Further, the extruded material must be cut into appropriate lengths before application of the wood paste.

SUMMARY OF THE INVENTION

According to a first aspect of the invention, a method of manufacturing an ornamented elongate member comprises the steps of:

extruding a first material;

cooling the first material so that it becomes substantially solid;

extruding a second material along a surface of the first material, while arranging for the surface of the first material to undergo a change which enables a firm bond to be formed between the materials;

shaping the second material whilst it is still plastic to produce surface ornamentation; and cooling the ornamented first and second materials to form a firmly bonded, substantially rigid structure.

This method provides a sequential extrusion method in which the materials are firmly bonded together. Furthermore, as the first material is substantially solid before extrusion of the second material onto it, the second material may be mechanically treated to produce the ornamentation without affecting the first material. Cooling times are of the order of a few minutes, so are substantially reduced in comparison with the wood paste product.

The first material is preferably a thermoplastic material, and the temperatures of the materials are arranged to melt the surface of the first material, enabling a bond to be formed between the materials.

The process may then include the step of pre-heating the first thermoplastic material after cooling and prior to the second extrusion, to aid the bonding mechanism.

Alternatively, the first material may be a thermosetting material, and chemical treatment used to provide the change in the surface of the first material, enabling a bond to be formed between the two materials. Alternatively, the temperatures of the materials may be controlled so that extrusion of the second material causes the change in the surface of the first material to form the bond.

The method may include a further step of biasing the cooling of the first and second materials to counteract any bowing of the materials thereby forming a firmly bonded and substantially straight structure. Alternatively, the first and second materials may be stressed, in combination with cooling, to counteract the bowing and form a firmly bonded, substantially straight structure. In either case, bowing is more easily counteracted than with the wood paste method.

It will be appreciated that the second material may be extruded such that it covers all or a part of the surface of the first material.

The materials to be extruded must be compatible, that is to say they must be capable of bonding together. The materials may each be plastics materials. The first is preferably a thermoplastic material, while the second may be a thermoplastic or a thermosetting material. The first material is preferably blown polystyrene. The second material may then be styrene. Alternatively, both materials could be thermoplastic rubbers. If the second material is compatible, then a third material may be sequentially extruded onto a surface of the second material.

The method may include an additional step of cutting the firmly bonded substantially rigid structure into lengths, which are suitable for use as frame members or the like.

Alternatively, the first material may be cut into appropriate lengths before application of the second material.

According to a second aspect of the invention, we provide an ornamented elongate member produced by the method of the first aspect.

BRIEF DESCRIPTION OF THE DRAWINGS

The invention will now be described by way of example only, and with reference to the accompanying drawings, wherein.

DETAILED DESCRIPTION OF THE PREFERRED EMBODIMENTS

Figure 1:
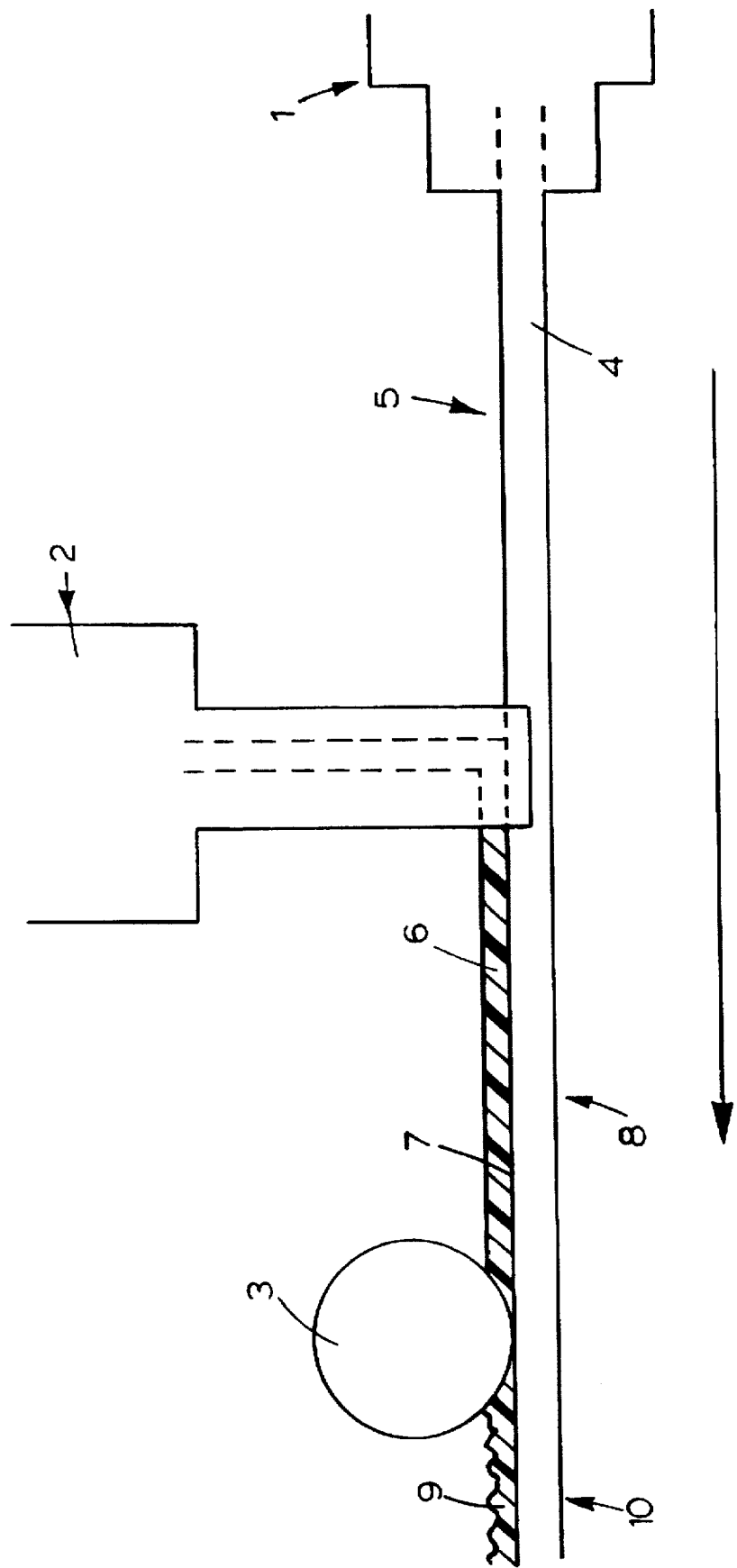
FIG. 1 is a schematic drawing of apparatus for the method used to form ornamented elongate members.

FIG. 1 shows apparatus for producing ornamented elongate members, such as picture frame members. The apparatus consists of a first extruder 1, a second extruder 2 and a pattern wheel 3. Means (not shown) are provided for conveying the extruded materials through the apparatus.

A first core thermoplastic material 4, in this case blown polystyrene, is extruded from the first extruder 1, and is conveyed along path 5 to the second extruder 2, during which time the material cools to form a substantially solid, rigid core for the frame member. The second extruder 2 extrudes a second thermoplastic material 6, in this case styrene, as a decorative material along the length of the core material 4. The temperature of the decorative material 6 is such as to melt the surface of the first material 4, enabling a firm bond to be formed at the interface 7 between the two materials.

The core and decorative materials are then fed along path 8, kept at a temperature such that the decorative material remains molten or at least plastic, and under the pattern wheel 3. This shapes the decorative material, forming ornamentation 9. The ornamented materials are then fed along path 10, where they are cooled to form a firmly bonded, substantially rigid structure. This structure is then cut into lengths suitable for use as frame members.

An additional step of pre-heating the surface of the core thermoplastic material 4 which is to be bonded, may be introduced in path 5 after cooling has taken place, thereby aiding the bonding process.

The cooling of the ornamented materials along path 10 may be biased in order to prevent any bowing which may occur, and ensures the forming of a firmly bonded, substantially straight and rigid structure.

Alternatively, the materials may, in combination with cooling, be stressed along this path in such a way to counteract any tendency to bow, thereby forming a firmly bonded, substantially straight and rigid structure.

Figure 2:
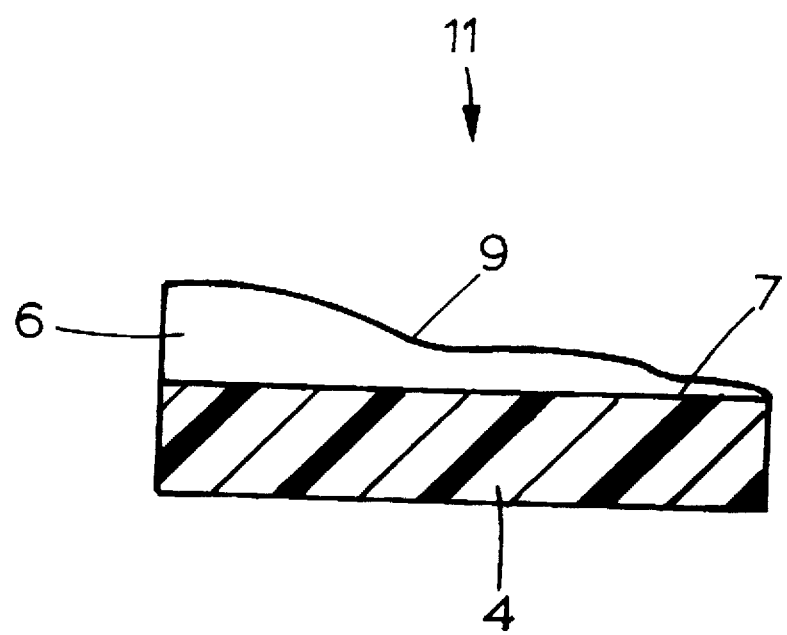
FIG. 2 is a section through a length of ornamented member.

FIG. 2 shows a section through a portion of a frame member 11, comprising the first thermoplastic material 4 bonded along the interface 7 with the second thermoplastic material 6, the second thermoplastic material having ornamentation 9 on its unbonded surface. A variety of ornamentation may be produced by simply changing the pattern wheel.

The materials used are chosen for their suitability for the items being made. While in the embodiment described the materials are blown polystyrene and styrene, it will be appreciated that other combinations are possible. Indeed, as long as the materials are compatible, in that a firm bond is formed between them, any suitable combination can be used. The first material may be thermoplastic or thermosetting, as may the second material. Materials other than plastics may also be used.

In a modification, not shown, the first and second materials in path 8 may be cooled to form a firm bond between them, and a third material extruded onto a surface of the second material. The third material may then be shaped, and the first, second and third materials cooled to form a firm bond between the second and third materials, and cut into lengths as previously described. It will be appreciated that a number of layers may be built up in this way, where the second, third etc. layer may cover part or all of the preceding layer, and where one or more layers may be shaped.

In a further modification, also not shown, the first material may be a thermosetting material, and chemical treatment applied in path 5, changing the surface of the first material so that a firm bond may be formed between it and the second material. As before, a number of layers may be built up in this way.

Although the manufacture of picture frame members has been described, this method may be used in the production of other items, such as dado rails and other decorative items.

What is claimed is:

1. A method of manufacturing an ornamental elongate member comprising the steps of extruding a first material, said first material being a thermoplastic material;

cooling said first material so that it solidifies;

extruding a second material along a surface of said first material, said surface of said first material being melted to enable a firm bond to be formed between said first and second materials;

mechanically treating said second material while it is still plastic to produce surface ornamentation in relief thereon without affecting the shape of said first material; and cooling said ornamented first and second materials to form a firmly bonded, solid structure.

2. An ornamented elongate member produced by the method of claim 1.

3. A method according to claim 1, and including the step of pre-heating said first thermoplastic material after cooling and prior to extrusion of said second material, to aid the bonding mechanism.

4. A method according to claim 1, and including the step of biasing said cooling of said first and second materials to counteract bowing of said first and second materials.

5. A method according to claim 1, and including the step of stressing said first and second materials during cooling to counteract bowing of said first and second materials.

6. A method according to claim 1, wherein said second material is a thermoplastic material.

7. A method according to claim 1, wherein said second material is a thermosetting material.

8. A method according to claim 1, wherein said first and second materials are each plastics materials.

9. A method according to claim 1, wherein said second material covers a part of said surface of said first material.

10. A method according to claim 1, and including the step of extruding a third material onto a surface of said second material, and cooling all three said materials.

11. A method according to claim 1, and including the step of cutting said firmly bonded solid structure into lengths.

12. A method according to claim 1, and including the step of cutting said extruded and cooled first material into lengths before application of said second material.

\* \* \* \* \*